Dec. 2, 1969  L. R. BURROUGHS  3,482,262
CARGO HOIST ENERGY ABSORPTION MEANS
Filed Jan. 11, 1968
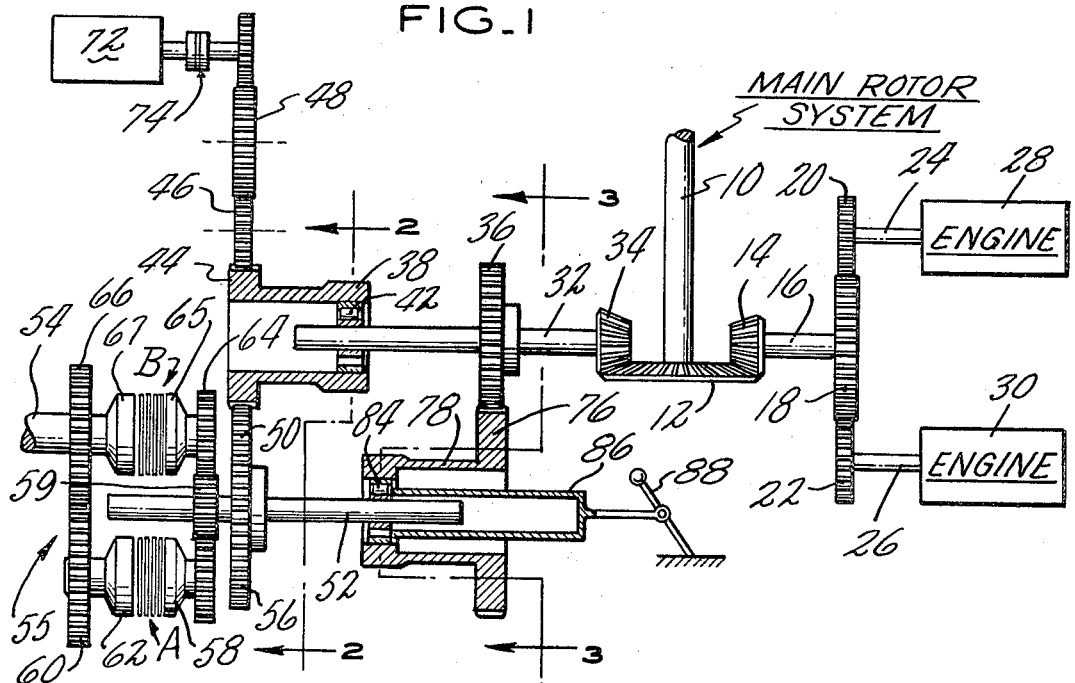
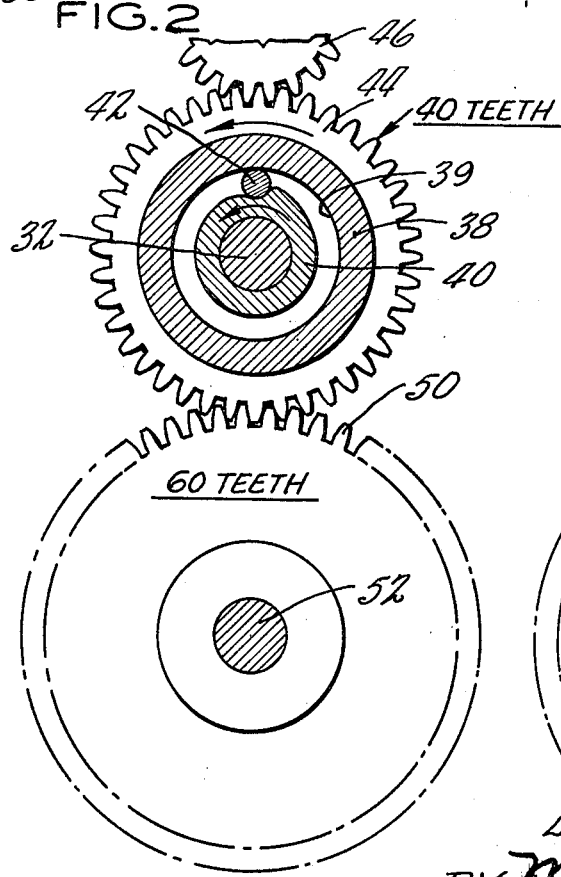
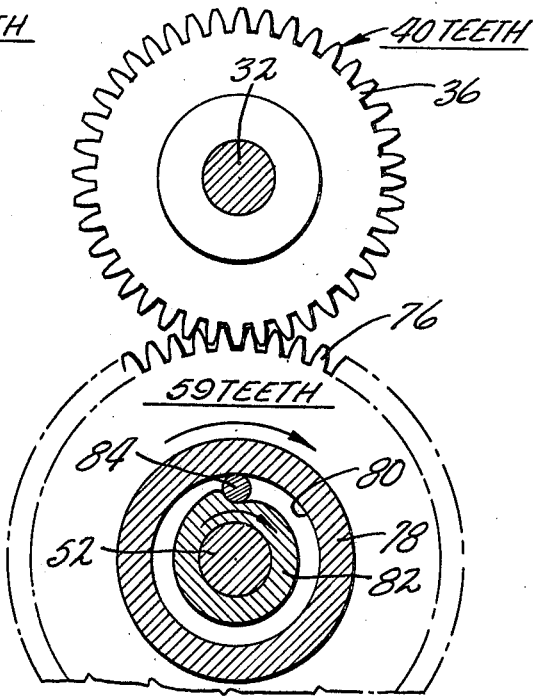
INVENTOR
LESTER R. BURROUGHS
BY Maurice B. Tasker
ATTORNEY

# United States Patent Office 3,482,262
Patented Dec. 2, 1969

3,482,262
CARGO HOIST ENERGY ABSORPTION MEANS
Lester R. Burroughs, Newtown, Conn., assignor to United Aircraft Corporation, East Hartford, Conn., a corporation of Delaware
Filed Jan. 11, 1968, Ser. No. 697,122
Int. Cl. B64c *27/12*
U.S. Cl. 416—146                    10 Claims

ABSTRACT OF THE DISCLOSURE

Apparatus for absorbing the energy of a helicopter cargo hoist when lowering its load wherein the drive shaft for the hoist, which in raising the load is driven from the main rotor drive system through a one-way drive clutch, is connected to drive the helicopter main rotor through a second one-way-drive clutch whenever the hoist drive shaft is driven by the hoist load. Manual lock-out means is provided for the second clutch to permit operation of the hoist from an accessory power unit when on the ground with the main rotor locked.

---

The invention described herein was made in the course of or under a contract with the Department of the Army.

BACKGROUND OF THE INVENTION

This invention relates to helicopters and particularly to helicopters which are equipped with a cargo hoist which obtains its power to raise a load from the main rotor drive system and which utilizes the main rotor for absorbing energy applied back into the system by the hoist during cargo lowering when the helicopter is in flight.

In helicopter cargo hoist systems the hoist and the other accessories are driven through a one-way-drive clutch from the main rotor drive means. This allows the hoist and the other accessories normally to be driven from the main rotor drive means while permitting the accessories including the hoist to be driven separately, when the helicopter is on the ground, from an auxiliary power unit. During hovering operations in flight, as for example during lowering of a heavy cargo carriage by the hoist, large loads cause the cargo hoist to function as a motor. Since these loads cannot be transmitted through the one-way-drive clutch to the rotor, they drive the accessories, and the weight of the load the hoist can lower is limited to the power the accessories can absorb. A "holding brake" is used and is "on" when power to the hoist is "off." To prevent the accessories from running away it is known to use a brake to absorb energy and a heat sink to dissipate it. A second solution to this problem is to utilize a restrictor in the lines of a hydraulic hoist system and to install a heat exchanger. For large heavy lift helicopters both solutions impose a severe weight penalty. Another undesirable solution is to connect the hoist directly to the rotor drive system, eliminating the one-way-drive clutch, but the hoist cannot be operated without driving the main rotor.

FIELD OF THE INVENTION

The present invention is well adapted for utilization with helicopter cargo hoist systems of the general character disclosed in U.S. Patent 3,176,940 and of the helicopter configurations disclosed in U.S. Patents Des. 193,-492 and Des. 197,823.

SUMMARY OF THE INVENTION

The present invention is directed to a second driving connection between the hoist drive shaft and the helicopter main rotor drive system such that excess energy developed when the hoist drive shaft is being driven by a heavy load on the hoist is absorbed by the main rotor rather than endangering the accessory system.

A primary object of this invention is to eliminate the means previously required for dissipating the energy generated by a heavy load on the hoist when the helicopter is lowering its cargo.

More specifically it is an object of the present invention to provide a driving connection between the hoist drive shaft and the main rotor drive system operative when the helicopter is lowering its cargo to absorb in the rotor system excessive loads generated by the cargo carried by the hoist.

A further object is a system wherein energy is absorbed in the rotor system to allow operation of the hoist independently from the rotor.

A further object of this invention is to provide, in addition to the usual drive from the helicopter main rotor to the hoist drive shaft, a second drive between these shafts having a one-way drive clutch therein which operates to drive the rotor from the cargo hoist drive shaft when the helicopter is lowering a heavy load on the hoist.

A further object is to provide a rotor energy absorbing system operable with either a mechanical or hydraulic hoist system.

A further object of this invention is generally to improve cargo hoist systems for helicopters.

Other objects and advantages of the novel features of the invention will be apparent from the following detailed description of the invention when considered in conjunction with the accompanying drawings.

BRIEF DESCRIPTION OF THE DRAWINGS

FIG. 1 is a schematic showing of the driving connections between the helicopter main rotor and the accessories, including the cargo hoist drive shaft, in accordance with this invention;

FIG. 2 is a section on line 2—2 of FIG. 1 on an enlarged scale; and

FIG. 3 is a section on line 3—3 of FIG. 1 on an enlarged scale.

DESCRIPTION OF THE PREFERRED EMBODIMENT

Referring to FIG. 1, a helicopter main rotor shaft 10 is driven through meshing bevel gears 12 and 14 from a shaft 16 which has a gear 18 fixed thereto. Gear 18 meshes with two engine driven gears 20 and 22 located on opposite sides thereof which are fixed to shafts 24 and 26 of two identical engines 28 and 30. In the embodiment shown in FIG. 1, for facility in describing the operation of the novel features of the cargo hoist system, the engines are assumed to be counterclockwise rotating engines, as viewed from the right of FIG. 1, which would result in a clockwise rotating main rotor, as viewed from above.

A shaft 32 has a bevel gear 34 meshing with gear 12 and has a spur gear 36 fixed to it intermediate its ends, for purposes later to be described. At its end remote from gear 34, shaft 32 extends into a tubular clutch housing 38 having an internal annular clutch surface 39 (FIG. 2). Shaft 32 has fixed to it, within housing 38, a cam 40 which is spaced from the surface 39 to receive a roller 42 to form a one-way-drive clutch, i.e., when shaft 32 and cam 40 are rotating counterclockwise (FIG. 2) clutch housing 38 is driven counterclockwise as indicated by the arrows in FIG. 2.

Clutch housing 38 has an integral gear 44 which drives a train of accessory gears including gears 46 and 48 on one hand and a gear 50 on the other hand. Gear 50 is fixed on a shaft 52 which drives the cargo hoist shaft 54 through a clutch and gear assembly generally indicated at 55. This is a well known article of commerce and consists of two clutch and gear units A and B. Unit A comprises a gear 56 integral with a clutch element 58 and a gear 60 integral with a mating clutch element 62. Unit B, which is identical, comprises a gear 64 integral with a clutch element 65 and a gear 66 integral with a clutch element 67. Gears 56 and 64 mesh with a gear 59 on shaft 52. Also gears 60 and 66 mesh with each other. Suitable clutch actuating mechanism (not shown) is provided by which either clutch may be engaged or disengaged. An auxiliary power unit 72 is provided which drives the accessory gear train and gear 44 through a disengageable clutch 74. While mechanical means has been shown herein for driving the cargo hoist, it will be understood that the invention is equally applicable to a system in which the shaft 54 is driven by hydraulic pump means. The mechanism described up to this point, with the exception only of gear 36, comprises the usual Sikorsky cargo hoist drive by which the shaft 54 is driven from the rotor shaft 10.

In accordance with this invention, gear 36 on shaft 32 meshes with gear 76 on a tubular clutch housing 78 which has an internal clutch surface 80. Shaft 52 has fixed to it a cam 82, sufficiently spaced from clutch surface 80 to accommodate a roller 84. Housing 78, cam 82 and roller 84 comprise a one-way-drive clutch similar to that comprising housing 38, cam 40 and roller 42. It should be particularly noted, however, that whereas the clutch driven by shaft 32 drives its housing and gear assembly when shaft 32 is rotated counterclockwise (FIG. 2) the housing and gear assembly on shaft 52 is driven only when shaft 52 is driven clockwise. In other words, these clutches drive in opposite directions of shaft rotation.

One other feature of the above described mechanism should be noted here. As indicated in FIGS. 2 and 3, meshing gears 44 and 50 (FIG. 2) have 40 and 60 teeth respectively while meshing gears 36 and 76 (FIG. 3) have 40 and 59 teeth respectively. These particular ratios of the meshing gears are not mandatory so long as the ratio of gears 36 and 76 is slightly less than the ratio of gears 44 and 50. This has been accomplished in the illustrated mechanism by having 40 teeth on gears 44 and 36 and by having 60 teeth on gear 50 and 59 teeth on gear 76.

While the one-way-drive clutches on shafts 32 and 52 have been described as identical except for direction of drive, the clutch on shaft 52 has an additional feature which allows it to be manually locked out, i.e., held in no-drive position by manual means. This lock-out mechanism, which is well known in this art, has been shown diagrammatically in FIG. 1 as a sleeve 86 which can be reciprocated axially by a lever 88. Axial movement of sleeve 86, by means of cam slots in the sleeve, causes clockwise rotation of a retainer (not shown) for the roller 84 (FIG. 3). A one-way-drive clutch with a lock-out device of this type is fully shown and described in U.S. Patent No. 2,644,535, issued July 7, 1953 to A. L. Koup et al., for Fluid Coupling Clutch.

In operation, when the helicopter is hovering to pick up a load by means of the cargo hoist, shaft 32 is rotating counterclockwise (FIG. 2), driven by gear 12 on the rotor shaft. One-way-drive clutch including roller 42 drives gear 44 counterclockwise, as viewed in FIG. 2. Gear 44 drives gears 50 and 59 on shaft 52 which causes gears 56 and 64 of clutch and gear assemblies A and B to be driven. By engaging clutch elements 65 and 67 the cargo hoist shaft 54 will be driven to raise the cargo, after which elements 65 and 67 will be disengaged. During this cargo raising operation gear 44 on shaft 32 is a driving gear and gear 50 on shaft 52 is a driven gear.

During lifting of the cargo by the main rotor drive, the accessory drive train is being driven by the rotor drive from gear 44. Also gear 76 is being driven by gear 36 in a clockwise direction, as indicated by the arrow in FIG. 3, while the cam 82 on shaft 52 is likewise being driven in a clockwise direction by gear 50 fixed to this shaft. It will be recalled that gears 44 and 36 each have 40 teeth; and that gear 50 has 60 teeth while gear 76 has only 59 teeth. Consequently, since gears 44 and 36 are rotating at the same speed, gear 50 and its connected cam 82 are rotating slower than gear 76. As a result, the one-way-drive clutch including roller 84 will overrun during cargo raising and in fact at all times when the shaft 32 is driving gear 44.

When its is desired to lower the cargo on the hoist cable, the helicopter will again hover and clutch elements 58 and 62 of clutch and gear assembly A will be engaged to establish through gears 66 and 60 and elements 62 and 58 the direction of rotation of the shaft 54 and the hoist drum, which will be in the opposite direction from that in which it was driven by the rotor to raise the cargo. The weight of the load, in excess of friction forces in the system, will now drive shaft 52 and gear 50. Gear 50 in turn drives gear 44 faster than the speed of rotation of gear 36, causing one-way-drive clutch including roller 42 to then overrun. The cargo load is now driving the accessories at an increased speed. In this connection it should be noted that although the weight of the cargo has reversed the direction of rotation of the hoist drive shaft 54, shaft 52 continues to run in the same direction due to the fact that, in cargo lowering, gears 60 and 66 are included in the drive through the clutch and gear assembly 55.

As shaft 52 is driven in a clockwise direction by power fed into the system by the weight of the lowering cargo, cam 82 which tends to rotate faster than gear 76 will engage and drive gear 76 and its meshing gear 36 on shaft 32. Since shaft 32 is geared to the main rotor, the latter will now be driven by power pumped into the system by the weight of the cargo and the rotor will absorb this power and prevent the cargo from driving the accessories at a ruinous speed. During this cargo lowering operation gear 76 on shaft 52 is a driving gear and gear 36 on shaft 32 is a driven gear.

If it is desired to operate the cargo hoist from the auxiliary power unit 72 while the helicopter is on the ground, operation of lever 88 to disconnect (or "lock into free wheeling mode") its associated clutch will permit this operation, during which the one-way-drive clutch on drive shaft 32 will overrun.

In the FIG. 1 embodiment, shaft 32 is shown as driven through bevel gear 12 of rotor drive shaft 10. This invention is equally applicable to systems wherein the hoist power takeoff shaft 32 is directly from the engine drive shaft which in turn is directly connected to the rotor drive system.

From the above description it will be evident that by this invention it has been made possible to lower a heavy load on the cargo hoist without damaging the accessories and without the necessity for providing large capacity brakes, hydraulic restrictors and heavy heat exchangers to dissipate the energy generated by the load.

Further it will be noted that a dual clutch system has been provided for permitting at all times during flight a positive connection between the rotor drive system and the hoist drive shaft.

It will further be evident that with the dual clutch system of this invention the accessories can absorb light lowering loads but can never be driven more than a safe amount faster than their normal speed by the cargo hoist load. In the illustrative gear ratios shown the accessories can absorb lowering loads up to about 1½% of their normal speed of rotation. If the load drives shaft 52 more than 1½% above its normal speed, shaft 52 is automatically connected to the rotor.

I claim:
1. In a helicopter, a main rotor drive shaft, a cargo hoist drive shaft, a driving connection between said rotor drive shaft and said hoist drive shaft including a one-way-drive clutch for driving the hoist drive shaft from the rotor drive shaft during lifting of a cargo, and a second driving connection between said rotor drive shaft and said hoist drive shaft including a one-way-drive clutch for driving the rotor drive shaft from the hoist drive shaft during lowering of a cargo by said hoist.

2. In a helicopter, a main rotor drive shaft, a cargo hoist drive shaft, a driving connection between said rotor drive shaft and said hoist drive shaft including a first shaft driven from said rotor drive shaft having a first gear fixed thereon and a second gear thereon driven from said first shaft through a first one-way-drive clutch, a second shaft having a third gear fixed thereon meshing with said second gear, and a fourth gear on said second shaft driven from the latter through a second one-way-drive clutch and meshing with said first gear.

3. In the combination of claim 2, an accessory gear train driven from said second gear, an auxiliary power unit for driving said gear train, a clutch controlling the connection of said unit to said gear train, and manual means for locking out said one-way-drive clutch on said second shaft.

4. The combination of claim 2 in which the ratio of the meshing second and third gears is greater than the ratio of the meshing first and fourth gears, whereby said second one-way-drive clutch overruns when said hoist drive shaft is being driven from the rotor drive shaft.

5. In a helicopter, a rotor drive shaft, a cargo hoist drive shaft, a dual geared driving connection between said shafts including two shafts, each having a driving gear and a driven gear, the driving gear of each shaft meshing with the driven gear of the other shaft, a one-way-drive clutch between each shaft and its driving gear, whereby power may be transmitted from the rotor shaft through one shaft and its associated clutch to the cargo shaft or from the latter through the other shaft and its associated clutch to the rotor shaft.

6. The combination of claim 5 in which the ratios of the meshing driving and driven gears is such that when power is being transmitted from the rotor shaft through one shaft to the cargo shaft the clutch associated with the other shaft overruns.

7. The combination of claim 5 in which the driving and driven gears on the one shaft have an equal number of teeth and in which the driving gear on the other shaft has one tooth less than the driven gear on said other shaft.

8. In a helicopter, a rotor drive shaft, a cargo hoist drive shaft, means for transmitting power between said rotor and cargo shafts including a first shaft having a geared connection to said rotor shaft, a second shaft having a geared connection to said cargo shaft, driving and driven gears on each shaft, the driving gear on each shaft meshing with the driven gear on the other shaft, a one-way-drive clutch between each shaft and its driving gear, a train of accessory gears meshing with the driving gear on said first shaft, an accessory power unit for driving said accessory gears, manually operative means for locking out the clutch associated with said second shaft, the ratio of the driving to the driven gears on said two shafts being such that the driving gear on said second shaft rotates faster than the second shaft when the first shaft is driving said hoist.

9. In a helicoptor, a rotor drive system including an engine driven shaft, a cargo hoist system including a hoist drive shaft, a driving connection between said engine driven shaft and said hoist drive shaft including a one-way-drive clutch for driving the hoist drive shaft from the engine driven shaft during lifting of a cargo, and a second driving connection between said shafts including a one-way-drive clutch for driving the engine driven shaft from the hoist drive shaft during lowering of a cargo by said hoist.

10. In a helicopter, a rotor drive system including an engine driven shaft, a cargo hoist system including a hoist drive shaft, a dual geared connection between said shafts including two shafts, each having a driving gear and a driven gear, the driving gear of each shaft meshing with the driven gear of the other shaft, a one-way-drive clutch between each shaft and its driving gear, whereby power may be transmitted from the engine driven shaft through one shaft and its associated clutch to said hoist drive shaft or from the latter through the other shaft and its associated clutch to the engine driven shaft.

References Cited

UNITED STATES PATENTS

| | | | |
|---|---|---|---|
| 2,979,968 | 4/1961 | Beurer | 170—135.75 XR |
| 3,062,068 | 11/1962 | Bodkin | 74—810 XR |
| 3,066,917 | 12/1962 | Tuplin et al. | 74—810 XR |
| 3,248,074 | 4/1966 | Cannon | 244—137 |

EVERETTE A. POWELL, Jr., Primary Examiner

U.S. Cl. X.R.

74—810; 416—169